May 8, 1951   R. G. STREUBER   2,552,069
SYSTEM FOR ENERGIZING ELECTRICAL PRECIPITATORS
Filed July 25, 1949   4 Sheets-Sheet 1
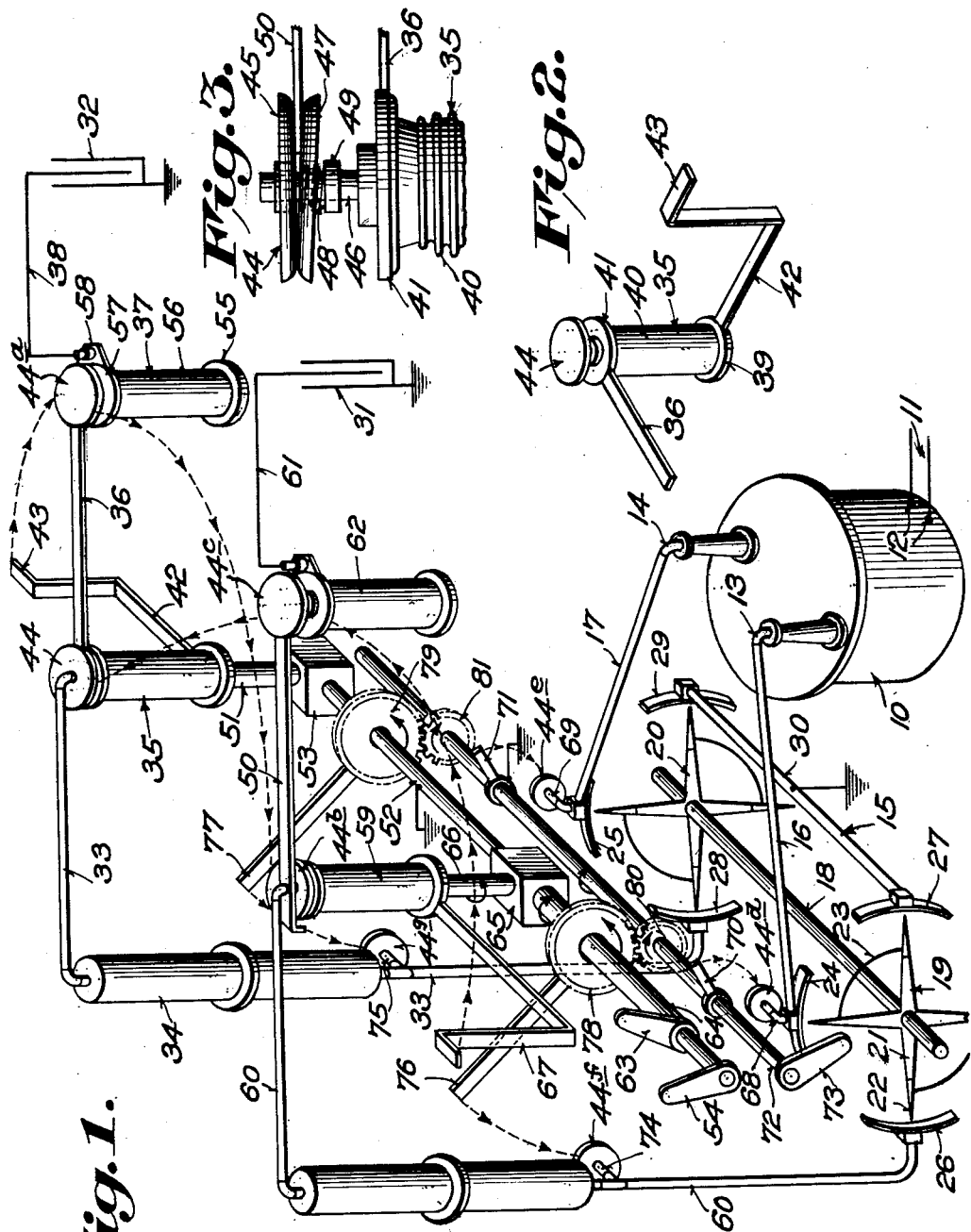
INVENTOR.
Rudolf G. Streuber
BY
Stowell & Evans
ATTORNEYS May 8, 1951 R. G. STREUBER 2,552,069
SYSTEM FOR ENERGIZING ELECTRICAL PRECIPITATORS
Filed July 25, 1949 4 Sheets-Sheet 2

INVENTOR.
Rudolf G. Streuber
BY
Stowell & Evans
ATTORNEYS

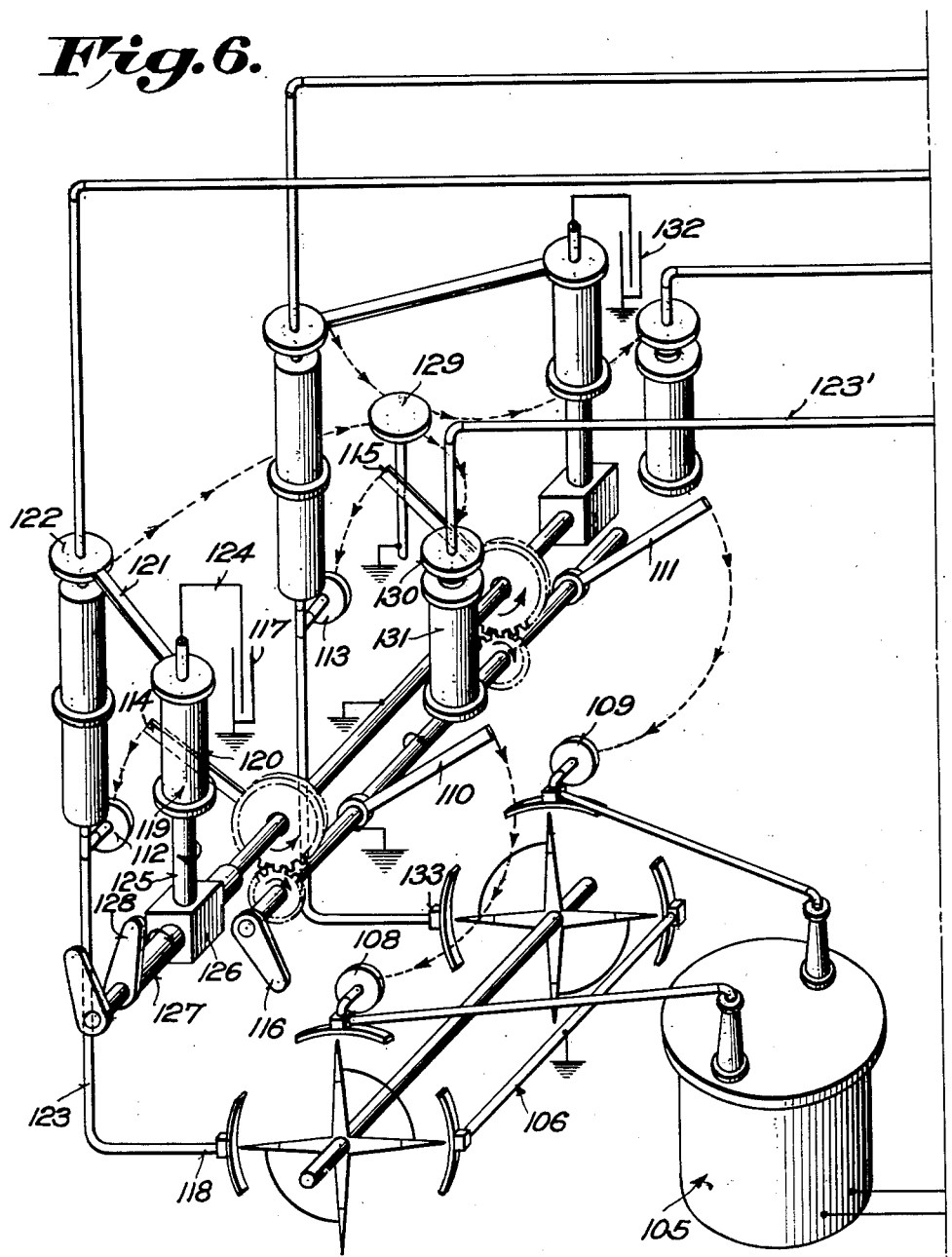

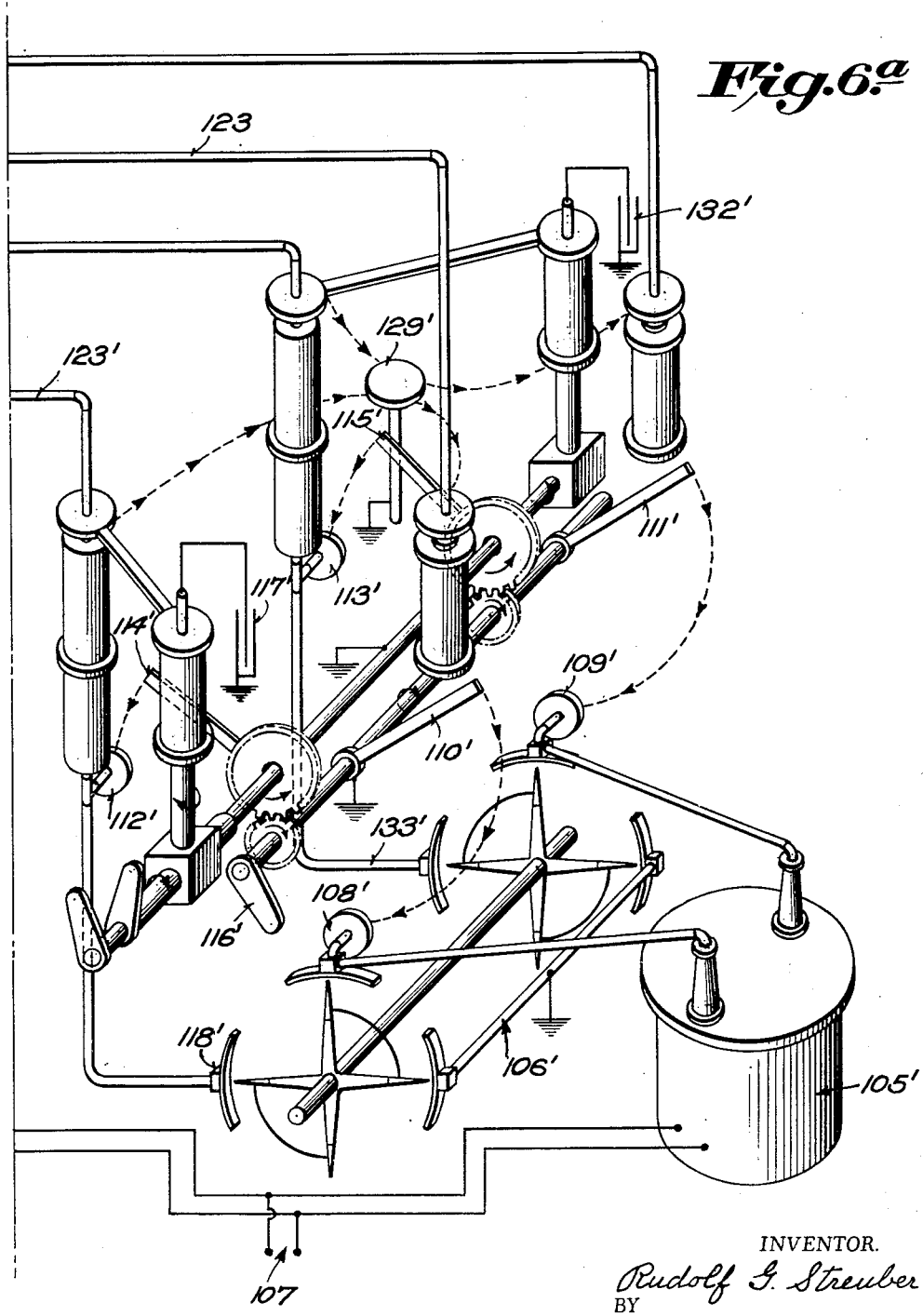

Patented May 8, 1951

2,552,069

UNITED STATES PATENT OFFICE 2,552,069

SYSTEM FOR ENERGIZING ELECTRICAL PRECIPITATORS

Rudolf G. Streuber, West Rockport, Maine, assignor to Research Corporation, New York, N. Y., a corporation of New York Application July 25, 1949, Serial No. 106,599

8 Claims. (Cl. 183—7)

1

This invention relates to electrical precipitation and more particularly to systems including switch mechanisms for controlling the energization of electrical precipitators.

An object of the invention is to provide a system for energizing electrical precipitators that increases safety of the personnel employed in operation of the apparatus.

Another object is to provide a system for the separate or conjoint energization of a plurality of electrical precipitators from a single source of power or from a plurality of power sources. The switch devices included in the system provide great flexibility in its adaptation to a wide variety of uses.

Another object is to provide in such a system a multiple switch device having a single control handle for simultaneously grounding a plurality of high potential points of an electrical precipitation installation.

Another object is to provide in such a system a switch construction whereby two electrical precipitators may be separately energized with alternate half-wave unidirectional current pulses from a single source of rectified alternating current or either of the two precipitators may be energized with full-wave rectified current from the same power source while the other precipitator is grounded.

Another object is to provide a switching system for energizing four electrical precipitators from two power supply devices, which system has great flexibility.

These and other objects of the invention are realized in a system for energizing electrical precipitators and the like including a power transformer having input and output terminals, a rectifier having input and output terminals, circuit means connecting the output terminals of the transformer to the input terminals of the rectifier, circuit means connecting the output terminals of the rectifier to the complementary electrodes of an electrical precipitator, a normally isolated grounding terminal connected to one of the output terminals of the transformer, a normally isolated grounding terminal connected to one of the output terminals of the rectifier, and switch means operable to ground the grounding terminals. The grounding switch means preferably is constructed and arranged for operation by a single handle for simultaneously grounding the terminals.

In the drawings:

Fig. 1 is a somewhat diagrammatic perspective view of one precipitator energizing system in accordance with the invention;

2

Fig. 2 is a detail perspective view of one of the switch elements of the system shown in Fig. 1;

Fig. 3 is an enlarged fragmentary view of the upper part of the switch element shown in Fig. 2;

Figure 4:
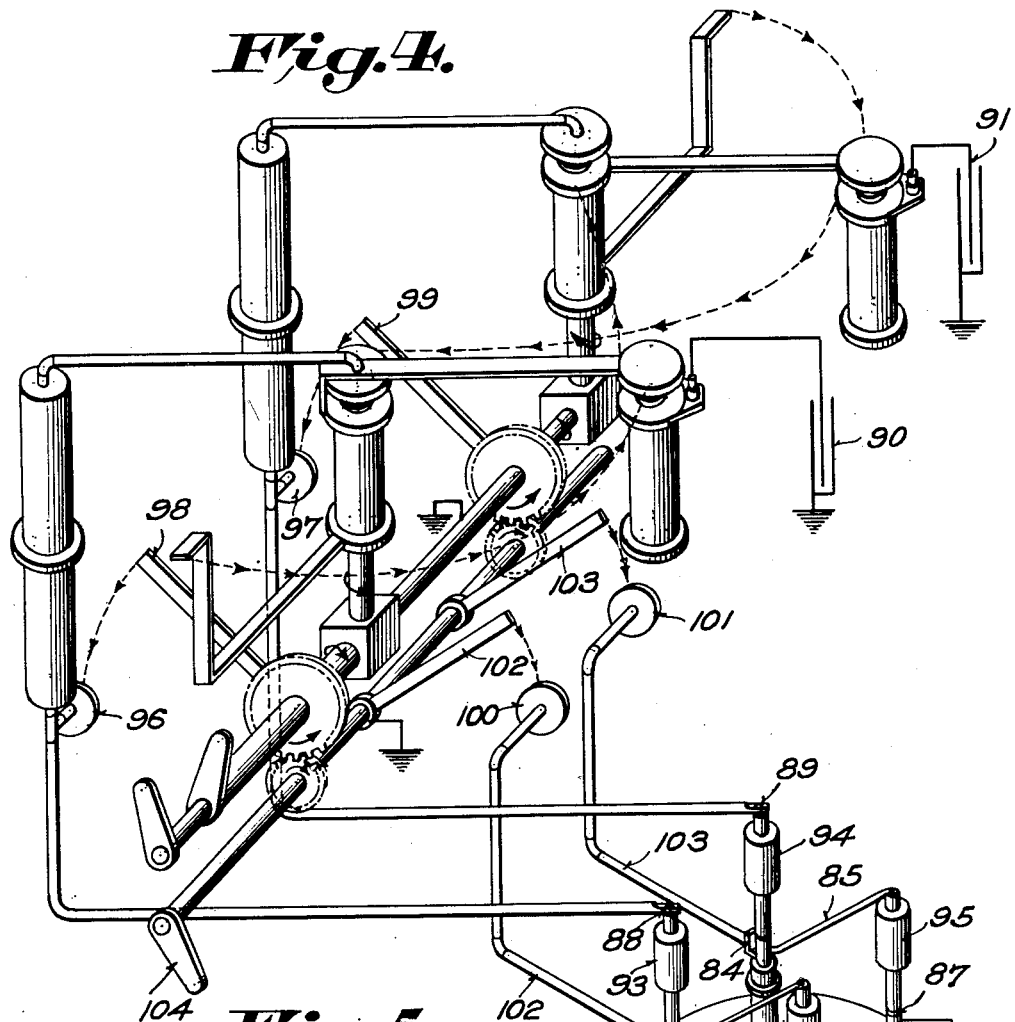
Fig. 4 is a perspective view similar to Fig. 1 of a modified form of precipitator energizing system.

Figs. 6 and 6a, taken together, show still another modified form of the invention.

Referring to the drawings, particularly to Fig. 1, the system shown provides either alternate half-wave energization for two precipitators or full-wave energization for either of the two precipitators from a single source of alternating current. An alternating current power transformer 10, having the usual primary and secondary windings, has its primary winding supplied with alternating current from the line 11 connected to input terminals 12, 12. The transformer output terminals 13, 14 deliver power from the transformer secondary winding to the rectifier, designated by the general reference numeral 15, through the conductors 16, 17. In common practice the input current may be 60 cycle alternating current of 6,000 volts and the transformer may step the voltage up to a working value of about 60,000 volts.

The rectifier 15 is a synchronous mechanical switch rectifier described and claimed in my copending application Serial No. 62,607, filed November 30, 1948, for Device for Rectifying Alternating Current. The rectifier has a shaft 18 that is rotated in synchronism with the alternations of the current supplied to the transformer. The shaft is driven at one-half the cyclic rate of the alternating current by a synchronous electric motor (not shown) powered by the same alternating current source that supplies the transformer, as is conventional.

A pair of rotors 19 and 20 are carried by the shaft 18 and rotate therewith. Each rotor has four insulating arms 21 spaced 90° apart and each arm has a pointed conductive tip 22. Jumper wires 23 interconnect opposite pairs of tips 22 in each rotor.

As will be seen from the drawing, the arms of the rotor are aligned with the arms of the other rotor to rotate in phase with each other. The opposed jumper wires in one rotor are positioned 90° out of phase with the opposed jumper wires of the other rotor.

Rotor 19 has a stationary arcuate input shoe 24 and a similarly positioned input shoe 25 is provided for the other rotor 20. Rotor 19 has two output shoes 26 and 27 spaced 90° ahead of and behind the input shoe 24. Rotor 20 has two similarly positioned output shoes 28 and 29. The input and output shoes are spaced slightly outside the circles of rotation of the rotor tips 22 and form the stator elements of the rectifying switch.

Input shoe 25 of the rectifier is connected to output terminal 14 of the transformer through conductor 17 and input shoe 24 is connected through conductor 16 to the other output terminal 13 of the transformer. Rectifier output shoes 27 and 29 are connected together by the grounded bus bar 30. Output shoes 26 and 28, the ungrounded rectifier output terminals, are connected to the load, in this case to the high tension electrodes of a pair of electrical precipitators 31 and 32 having grounded complementary collecting electrodes.

In operation, the rectifier rotors 19 and 20 turn at one-half the cyclic rate of the alternating current supplied to the transformer; for example, with 60 cycle current the rotors turn at 30 R. P. S., or 1,800 R. P. M. In the stage of operation shown in Fig. 1, if the transformer terminal 14 is negative, input shoe 25, output shoe 28 and the high tension electrode of precipitator 32 are also negatively charged. At the same time, output terminal 13 of the transformer, input shoe 24 and output shoe 27 of the rectifier are positively charged as is also the grounded complementary electrode of precipitator 32.

When the transformer output terminals reverse polarity, terminal 13 is negative and terminal 14 is positive. At this point, the rotors 19 and 20 will have turned 90° from their Fig. 1 position. Now, input shoe 24, output shoe 26 and the high tension electrode of precipitator 31 are negatively charged and input shoe 25, output shoe 29 and the grounded electrode of precipitator 31 are positively charged.

This cycle of events repeats itself with each change of polarity of the output terminals of the transformer, and the high tension electrodes of the precipitators 31 and 32 are alternately energized with half-wave current pulses having negative polarity. It will be evident that the polarities of the precipitator electrodes may be reversed by reversing such connections as the transformer output leads.

Current from the rectifier output shoe 28 is carried to the high tension electrode of precipitator 32 through conductor 33 that passes through an insulating bushing 34 and makes contact with a movable switch element generally designated 35. The current passes across the switch blade 36 to the corresponding switch element 37 and thence through the cable 38 to the high tension electrode of precipitator 32.

Switch element 35 is a movable or rotatable switch element shown in detail in Figs. 2 and 3. It has a conductive base plate 39 on which is mounted an insulating column 40 surmounted by a conductive top plate 41. The top plate 41 carries the switch blade 36, previously described. A grounded switch blade 42 is carried by the bottom plate 39 and is disposed at right angles to the switch blade 36. The grounded blade has an offset contact portion 43 that rises to the level of blade 36.

As best seen in Fig. 3, the top of the movable switch element 35 has a pair of contact plates, generally designated 44, including an upper relatively fixed plate 45 carried by the post 46 and an immediately subjacent plate 47 biased into engagement with the upper plate 45 by a spring 48 compressed between the under side of the plate 47 and a collar 49 on the post 46. A switch blade 50 swung from another rotatable switch element may make contact with the contact plates 44 by cutting between them, as shown in Fig. 3, the spring 48 yielding to permit the blade 50 to enter between the plates.

The rotary switch element 35 is fixed to a vertical shaft 51, as shown in Fig. 1. The vertical shaft 51 is rotated by a horizontal shaft 52 through miter gears in gear box 53. A handle 54 on the end of shaft 52 is employed for manually rotating the latter.

The stationary switch element 37 includes a fixed base plate 55, an insulating column 56, a conductive top plate 57 carrying the contact plates 44a that are similar to the contact plates 44, and an offset terminal portion 58 to which the power transmission cable 38 is connected.

It will be seen that when the movable switch element 35 is rotated in the direction of the arrows in Fig. 1, the blade 36 is disengaged from the complementary contact plates 44a, thus disconnecting the high tension electrode of precipitator 32 from the power conductor 33. Further rotation of the movable switch element will bring the offset portion 43 of the grounded blade into engagement with the contact plates 44a, thus grounding the high tension electrode of precipitator 32. At the same time, the switch blade 36 engages the contact plates 44b of the movable switch element 59 that is similar to the switch element 35 described hereinbefore, thereby throwing the power from rectifier shoe 28 to the high tension electrode of precipitator 31 which is already being energized with power from rectifier output shoe 26. This results in the application of full-wave rectified current to the electrodes of precipitator 31.

Current from rectifier output shoe 26 is carried to precipitator 31 through conductor 60, switch blade 50 and cable 61.

Movable switch element 59 cooperates with the complementary stationary switch element 62 in the same manner that switch elements 35 and 37 cooperate. Switch element 59 is rotated by a handle 63 attached to a sleeve shaft 64 that acts through miter gearing in gear box 65 to rotate the shaft 66 on which the movable switch element is mounted. As indicated by the arrows in Fig. 1, rotation of switch element 59 may ground the high tension electrode of precipitator 31 through grounded switch blade 67 and, at the same time, the output from rectifier shoe 26 is shunted to the contact plates 44 on the other movable switch element 35.

The switching arrangement thus far described permits both precipitators to be energized with alternate half-waves of unidirectional current or permits either precipitator to be grounded while the other is operated on full-wave rectified current.

An advantageous safety device is provided in the present energizing system whereby all of the points of high potential in the system may be grounded by the actuation of a single lever. Such high potential points exist in the circuit including the transformer secondary winding and the rectifier input terminals and in the circuits connecting the ungrounded rectifier output terminals with the high tension electrodes of the precipitators.

For grounding the transformer output circuit, contact plates 44d and 44e are mechanically and electrically connected to the rectifier input shoes 24 and 25 by brackets 68 and 69 respectively. These contact plates are similar to the contact plates 44, described in detail with reference to Fig. 3, and they are oriented in a vertical plane. Complementary grounded switch blades 70 and 71 are mounted on a shaft 72 that is parallel to the shafts 52 and 64 that control the movable switch elements 35 and 59. A handle 73 is provided for rotating the shaft 72. When the handle 73 is rotated in a clockwise direction, as seen in Fig. 1, the blades 70 and 71 are engaged between the contact plates 44d and 44e respectively to ground this section of the high tension current supply.

For grounded the leads from the rectifier to the precipitators, contact plates 44f and 44g, also similar to the contact plates 44, are provided. These plates are mounted in a vertical plane on arms 74 and 75 extending from the conductors 60 and 33 respectively. Grounded switch blades 76 and 77 that are carried by gear wheels 78 and 79 floatingly borne by the shafts 64 and 52, respectively, are constructed and arranged to make contact with the contact plates 44f and 44g when the gear wheels are rotated. The gear wheels 78 and 79 mesh with pinions 80 and 81 fixed to the grounding shaft 72 so that when the grounding shaft 72 is turned to ground contact plates 44d and 44e, as described hereinbefore, the switch blades 76 and 77 are simultaneously rotated to ground the contact plates 44f and 44g. It will be understood that the gear ratios are so selected that simultaneous grounding of the four contact plates 44d, 44e, 44f and 44g occurs.

From the foregoing description it will be seen that the entire precipitation and energization system therefor is grounded when the single grounding lever 73 is operated to close the four grounding switches under control thereof and that any residual charges in the system are thus neutralized to render the system safe and free from lethal charges. Accidental charging of the system is also prevented.

The system shown in Fig. 4 is similar to that shown in Fig. 1 and described in detail hereinbefore. It differs primarily therefrom in the type of rectifier employed. The system of Fig. 4 utilizes a bridge-connected vacuum tube full-wave rectifying device instead of the mechanical rectifier of the system of Fig. 1.

In Fig. 4, 82 represents the power transformer, having output terminals 83 and 84. The bridge-connected full-wave rectifier is designated by the general reference numeral 85 and has input terminals directly connected to the output terminals 83 and 84 of the transformer. The grounded output terminals of the rectifier are indicated at 86 and 87 and the ungrounded output terminals thereof are designated 88 and 89. The ungrounded output terminals of the rectifier are connected to the high tension electrodes of the precipitators 90 and 91 respectively through circuit means including a switching system identical with that described in connection with Fig. 1; therefore, it is not essential to repeat, at this point, the detailed description that has been set forth hereinbefore with respect to the switch portion of the apparatus.

Figure 5:
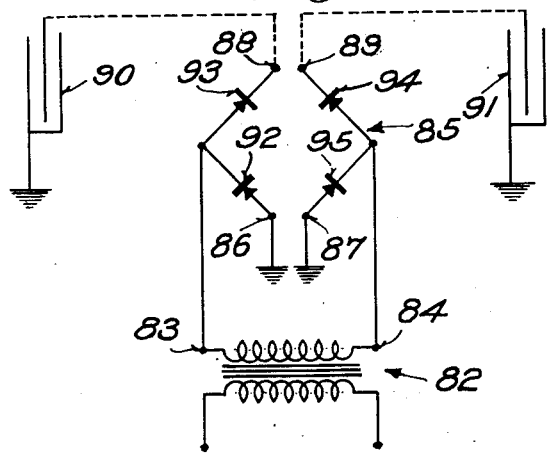
Fig. 5 is a diagram of the rectifier circuit of the apparatus of Fig. 4.

The circuit of the bridge-connected full-wave rectifier 85 is shown diagrammatically in Fig. 5. The output terminals of the transformer 82 and the input and output terminals of the rectifier are designated by the same reference numerals as the corresponding parts in Fig. 4. Rectifiers 92, 93, 94 and 95, which preferably are kenotron vacuum tube rectifiers, are connected in the bridge circuit as shown. It is evident that negative pulses corresponding to alternate half waves of the alternating current supplied to the transformer appear at the ungrounded output terminals 88 and 89 of the full-wave rectifier when the transformer is energized.

Referring to Fig. 4, a switch mechanism for grounding the high potential points of the energizing system includes the contact plates 96 and 97 that cooperate with switch blades 98 and 99 to ground the rectifier output terminals and the precipitation apparatus. Similar contact plates 100 and 101 are mounted on conducting arms 102 and 103 and are electrically connected to the transformer output and rectifier input terminals 83 and 84. Grounded switch blades 102 and 103 cooperate with the contact plates 100 and 101 to ground the terminals 83 and 84. When the grounding lever 104 is rotated, the contact plates 96, 97, 100 and 101 are simultaneously connected to ground.

The precipitator energizing system shown in Figs. 6 and 6a may be called a double system in which two power supply units energize four electrical precipitators. The power supply units include the transformers 105 and 105' the outputs of which are fed to the rotary switch synchronous rectifiers 106 and 106'. The construction and arrangement of these components of the power supply are identical with those of the power supply shown in Fig. 1 and described hereinbefore. It is convenient to supply alternating current to the transformers from a common source such as the line 107 and to drive the rectifier motors (not shown) at synchronous speed from the same source of current.

The main grounding switches are also substantially identical with the main grounding switch of the system of Fig. 1. These switches include the contact plates 108, 109 and 108', 109' providing grounding terminals for the transformer output and rectifier input circuits. Switch blades 110, 111 and 110', 111' serve to ground these contact plates. Grounding contact plates 112, 113 and 112', 113' are provided for the high tension output circuits of the rectifiers; these are grounded by the switch blades 114, 115 and 114', 115' when the main grounding switches are operated by the levers 116, 116'.

The precipitator, indicated diagrammatically at 117, is energized with half-wave current from the output shoe 118 of the rectifier 106. A movable switch element 119 mounted on a rotatable insulating column 120 has a switch blade 121 that engages the contact plates 122 connected to the output conductor 123 from the output shoe 118. Current is conducted from the movable switch element 119 to the high tension electrode of the precipitator 117 through the transmission cable 124.

Means for rotating the switch element 119 includes a vertical shaft 125, the gear box 126, the sleeve shaft 127 and the operating lever 128.

The high tension electrode of precipitator 117 may be directly grounded by moving the switch blade 121 into engagement with the grounded contact plates 129, as shown by the arrows in Fig. 6.

Alternatively, precipitator 117 may be energized with half-wave current from the output shoe 118' of the other rectifier 106'. To accomplish this, the switch blade 121 is moved to engage the contact plates 130 supported on insulating column 131 and connected by the conductor 123' to the output shoe 118'.

Similarly, the precipitator 117' is energized with half-wave rectified current from the output shoe 118' of the rectifier 106' or from the output shoe 118 of the rectifier 106, or the precipitator may be grounded through the grounded contact plate 129'.

Likewise, precipitators 132 and 132' may be energized with half-wave current from the output terminals 133 or 133' or they may be individually switched to the grounded contact plates 129 and 129'.

From the foregoing description it will be seen that the present invention provides a system for energizing electrical precipitators that is flexible, safe, compact and efficient and that is adaptable to a wide variety of installations where a plurality of electrical precipitators are to be energized.

I claim:

1. A system for energizing electrical precipitators comprising a power transformer having input and output terminals, a rectifier having input and output terminals, circuit means connecting the output terminals of said transformer to the input terminals of said rectifier, electrical precipitator means having complementary electrodes, circuit means connecting the output terminals of said rectifier to the complementary electrodes of said electrical precipitator, a normally isolated grounding terminal connected to the transformer output circuit, a normally isolated grounding terminal connected to the output circuit of said rectifier, separate switch means operable to ground each of said grounding terminals and a switch operating device including means linking said switches together for operation to simultaneously ground said grounding terminals.

2. In a system for energizing electrical precipitators including a power transformer having input and output terminals, a rectifier having input and output terminals, circuit means connecting the output terminals of said transformer to the input terminals of said rectifier, electrical precipitator means having complementary electrodes, and circuit means including a grounded return connecting the output terminals of said rectifier to the complementary electrodes of said electrical precipitator, a normally isolated grounding terminal connected to one of the output terminals of said transformer, a normally isolated grounding terminal connected to the ungrounded output terminal of said rectifier, separate switch means operable to ground each of said grounding terminals and a switch operating device including means linking said switches together for operation to simultaneously ground said grounding terminals.

3. In a system for energizing electrical precipitators including a power transformer having input and output terminals, a rectifier having input and output terminals, circuit means connecting the output terminals of said transformer to the input terminals of said rectifier, electrical precipitator means having complementary electrodes, and circuit means including a grounded return connecting the output terminals of said rectifier to the complementary electrodes of said electrical precipitator, a normally isolated grounding terminal connected to one of the output terminals of said transformer, a normally isolated grounding terminal connected to the ungrounded output terminal of said rectifier, and mechanically operated switch means having a single operating handle for simultaneously grounding said grounding terminals.

4. A system for energizing electrical precipitators and the like comprising a single phase power transformer having input and output terminals, a full-wave rectifier having input terminals and output terminals including a pair of normally ungrounded output terminals charged with alternate half-wave current pulses, circuit means connecting the output terminals of said transformer to the input terminals of said rectifier, a pair of insulated circuit means each connecting one of said pair of normally ungrounded rectifier output terminals to one of a pair of complementary electrodes of each of two electrical precipitators, grounded return circuits from the other complementary electrodes of the precipitators to said rectifier, switch means in each of said insulated circuit means for disconnecting the circut from its precipitator electrode and for grounding the disconnected precipitator electrode, a normally isolated grounding terminal connected to one of the output terminals of said transformer, normally isolated grounding terminals connected to said ungrounded rectifier output terminals, and switch means operable to ground said grounding terminals.

5. A system for energizing electrical precipitators and the like comprising a single phase power transformer having input and output terminals, a full-wave rectifier having input terminals and output terminals including a pair of normally ungrounded output terminals charged with alternate half-wave current pulses, circuit means connecting the output terminals of said transformer to the input terminals of said rectifier, a pair of insulated circuit means each connecting one of said pair of normally ungrounded rectifier output terminals to one of a pair of complementary electrodes of each of two electrical precipitators, grounded return circuits from the other complementary electrodes of the precipitators to said rectifier, switch means in each of said insulated circuit means for disconnecting the circuit from its precipitator electrode and for grounding the disconnected precipitator electrode, a normally isolated grounding terminal connected to one of the output terminals of said transformer, normally isolated grounding terminals connected to said ungrounded rectifier output terminals, mechanical switch means operable to ground said grounding terminals, and means for operating said mechanical switch means in unison.

6. A system for energizing electrical precipitators and the like comprising a single phase power transformer having input and output terminals, a full-wave rectifier having input terminals and output terminals including a pair of normally ungrounded output terminals charged with alternate half-wave current pulses, circuit means connecting the output terminals of said transformer to the input terminals of said rectifier, a pair of insulated circuit means each connecting one of said pair of normally ungrounded rectifier output terminals to one of a pair of complementary electrodes of each of two electrical precipitators, grounded return circuits from the other complementary electrodes of the precipitators to said rectifier, switch means in each of said insulated circuit means for disconnecting the circuit from its precipitator electrode and short circuiting the circuit to the other of said insulated circuit means and for grounding the disconnected precipitator electrode, a normally isolated grounding terminal connected to one of the output terminals of said transformer, normally isolated grounding terminals connected to said ungrounded rectifier output terminals, mechanical switch means operable to ground said grounding terminals, and means for operating said mechanical switch means in unison.

7. A system for energizing electrical precipitators and the like comprising a single phase power transformer having input and output terminals, a full-wave rectifier having input terminals and output terminals including a pair of normally ungrounded output terminals charged with alternate half-wave current pulses, circuit means connecting the output terminals of said transformer to the input terminals of said rectifier, a pair of insulated circuit means each connecting one of said pair of normally ungrounded rectifier output terminals to one of a pair of complementary electrodes of each of two electrical precipitators, grounded return circuits from the other complementary electrodes of the precipitators to said rectifier, switch means in each of said insulated circuit means for disconnecting the circuit from its precipitator electrode and short circuiting the circuit to the other of said insulated circuit means and for grounding the disconnected precipitator electrode, a normally isolated grounding terminal connected to one of the output terminals of said transformer, normally isolated grounding terminals connected to said ungrounded rectifier output terminals, mechanical switch means operable to ground said grounding terminals, and means for operating said mechanical switch means in unison.

8. A system for energizing electrical precipitators and the like comprising two single phase power transformers having input and output terminals, a full-wave rectifier for each of said transformers, each rectifier having input terminals and output terminals including a pair of normally ungrounded output terminals charged with alternate half-wave current pulses, circuit means connecting the output terminals of each of said transformers to the input terminals of the corresponding full-wave rectifier, separate insulated circuit means connecting each of said normally ungrounded rectifier output terminals to one of a pair of complementary electrodes of each of four electrical precipitators, grounded return circuits from the other complementary electrodes of the precipitators to said rectifier, switch means in at least one of said insulated circuit means for disconnecting the precipitator electrode therefrom and for connecting it to another of said insulated circuit means, normally isolated grounding terminals connected to the output terminals of said transformers, normally isolated grounding terminals connected to the ungrounded rectifier output circuits, and switch means operable to ground said terminals.

RUDOLF G. STREUBER.

REFERENCES CITED

The following references are of record in the file of this patent:

UNITED STATES PATENTS

| Number | Name | Date |
|---|---|---|
| 2,254,214 | Gage | Sept. 2, 1941 |
| 2,283,727 | Gage | May 19, 1942 |
| 2,294,843 | Gage | Sept. 1, 1942 |
| 2,427,740 | Pegg | Sept. 23, 1947 |